United States Patent [19]

Yoshino

[11] Patent Number: 4,799,695
[45] Date of Patent: Jan. 24, 1989

[54] METALLIC GASKET

[75] Inventor: Nobuo Yoshino, Tokyo, Japan

[73] Assignee: Nihon Metal Gasket Kabushiki Kaisha, Saitama, Japan

[21] Appl. No.: 114,699

[22] Filed: Oct. 29, 1987

Related U.S. Application Data

[60] Division of Ser. No. 827,837, Feb. 7, 1986, abandoned, which is a continuation-in-part of Ser. No. 725,142, Apr. 19, 1985, abandoned, which is a continuation-in-part of Ser. No. 493,174, May 10, 1983, abandoned.

[30] Foreign Application Priority Data

| May 17, 1982 | [JP] | Japan | 57-81530 |
| May 17, 1982 | [JP] | Japan | 57-81531 |
| Dec. 27, 1985 | [JP] | Japan | 60-292892 |
| Dec. 27, 1985 | [JP] | Japan | 60-292893 |

[51] Int. Cl.⁴ ............................................. F16J 15/08
[52] U.S. Cl. ........................... 277/231; 277/234; 277/235 B
[58] Field of Search ............... 277/231, 232, 233, 234, 277/235 B, 213, 207 R, 209, 211

[56] References Cited

U.S. PATENT DOCUMENTS

| 1,050,132 | 1/1913 | Haynes | 277/213 |
| 2,034,610 | 3/1936 | Dickson | 277/232 |
| 2,397,597 | 4/1946 | Dunkle | 277/213 |
| 3,477,867 | 11/1969 | Hillier | 277/235 B X |
| 3,567,234 | 3/1971 | Skrycki | 277/235 B |
| 3,738,558 | 6/1973 | Colwell | 277/235 B |
| 3,806,138 | 4/1974 | Herrington | 277/234 X |
| 4,196,913 | 4/1980 | Oka | 277/235 B |
| 4,290,616 | 9/1981 | Nicholson | 277/235 B |
| 4,471,968 | 9/1984 | Schlaupitz et al. | 277/235 B |

FOREIGN PATENT DOCUMENTS

| 210214 | 12/1959 | Austria | 277/235 B |
| 2030487 | 1/1971 | Fed. Rep. of Germany | 277/235 B |
| 810728 | 3/1937 | France | 277/235 B |
| 1370125 | 10/1974 | United Kingdom | 277/213 |
| 1549200 | 7/1979 | United Kingdom | 277/235 B |

Primary Examiner—Allan N. Shoap
Attorney, Agent, or Firm—Flynn, Thiel, Boutell & Tanis

[57] ABSTRACT

A metallic gasket having a base plate made of an elastic metal plate formed with a combustion chamber hole. A bead is formed on the base plate around the combustion chamber hole. A subplate having a bead is laminated on this base plate. An edge of the subplate, around the combustion chamber hole, is folded back so as to surround and sandwich the edge of the base plate, thereby constituting a compensating rim portion having a predetermined thickness larger than that of the other portion. When the cylinder head is tightened, the metallic gasket is compressed and deformed. However, a sealing effect is assured due to the thick compensating portion.

8 Claims, 3 Drawing Sheets

METALLIC GASKET

CROSS REFERENCE TO RELATED APPLICATIONS

This is a division of Ser. No. 827,837, filed Feb. 7, 1986, now abandoned, which is a continuation-in-part of copending application Ser. No. 725,142, filed Apr. 19, 1985, now abandoned, which in turn was a continuation-in-part of application Ser. No. 493,174, filed May 10, 1983, now abandoned. The disclosures of these latter applications, in their entirety, are incorporated herein by reference.

FIELD OF THE INVENTION

The present invention relates to a metallic gasket and, more particularly, to a metallic gasket capable of preventing increase and decrease in gap width between the deck surfaces around the combustion chamber which are caused when the cylinder head is tightened, and thereby improving the sealing performance.

BACKGROUND OF THE INVENTION

In general, a metallic gasket is used in the joint area between the cylinder head and the cylinder block of an internal combustion engine. The metallic gasket has beads formed to seal the deck surfaces between the cylinder head and the cylinder block. When those beads are tightened by tightening means such as bolts or the like for joining the members to be joined, the beads form elastic seal lines on the deck surfaces due to the tightening forces of the tightening means, thereby attaining a sealing effect.

However, when the cylinder head is tightened to the cylinder block through the metallic gasket by the tightening bolts, the cylinder head is curved due to the tightening forces of the bolts, particularly, the gap around the combustion chamber increases, so that distortions occur. Consequently, there are the following inconveniences. Namely, the combustion gas leaks from the portions where those distortions occurred and pollutes the metallic gasket interposed in the joint area. The substance contained in the combustion gas is deposited, causing the sealing effect to deteriorate. Further, in operation, the gap between the deck surfaces around the combustion chamber increases and decreases in dimension due to influences of, for example, the combustion gas pressure and the heat of the engine, causing the beads of the metallic gasket to be fatigued due to an alternating load. In addition, there is the risk such that this alternating load also acts on the tightening bolts, so that the bolts and the cylinder head portions which are brought into engagement with the bolts are damaged. Moreover, there is the problem that the tightening forces of the bolts are reduced and the sealing effect of the metallic gasket deteriorates.

SUMMARY OF THE INVENTION

It is an object of the present invention to provide a metallic gasket in which the gap between the deck surfaces around the combustion chamber which is formed when the cylinder head is tightened can be compensated by a compensation portion, and the pollution of the metallic gasket and the reduction of the sealing effect can be prevented, thereby attaining a stable sealing effect.

To accomplish this object, according to one aspect of the invention, there is provided a metallic gasket capable of attaining a sealing effect by providing a combustion chamber hole and a bead surrounding this hole on a base plate made of an elastic metal plate, a subplate is laminated on the base plate and the inner annular edge portion of this subplate around the perimeter of the combustion chamber hole is folded around the inner edge of the base plate so as to form a compensation rim portion having a predetermined thickness, which compensating portion is provided directly around the side or perimeter of the combustion chamber hole.

According to the constitution of this invention, to compensate for the gap between the deck surfaces around the combustion chamber which is formed when the cylinder head is tightened, the compensating portion of predetermined thickness is formed around the edge of the combustion chamber hole, rather than the portions of the beads. Due to this, the large gap between the deck surfaces around the combustion chamber is compensated, this prevents the gap between the deck surfaces from being increased and decreased due to the influences of the combustion gas pressure and the heat of the engine, and fatigue of the beads is prevented by reducing the action of the alternating load on the beads. In addition, the combustion chamber is surrounded by both the compensating portion and the bead portions, thereby effectively preventing leakage of the combustion gas. Further, the constitution can be simplified and the metallic gaskets can be easily manufactured with a decrease in costs.

According to another aspect of the present invention, an intermediate plate is laminated on the compensating plate, the latter having its edge around the combustion chamber hole folded back. A base plate made of an elastic metal plate and formed with a bead is laminated on at least one of the laminated compensating and intermediate plates. A compensating portion having a predetermined thickness is provided around the side of the combustion chamber hole, thereby to prevent the increase and decrease of the gap between the deck surfaces.

According to the constitution of this invention, to compensate for the gap between the deck surfaces which is formed when the cylinder head is tightened, the compensating portion of a predetermined thickness is formed around the side of the combustion chamber hole, rather than the bead portions arranged so as to directly surround the combustion hole. Due to this, the large gap between the deck surfaces around the combustion chamber is compensated. This prevents the gap between the deck surfaces from increasing and decreasing due to the influences of the combustion gas pressure and the heat of the engine. The fatigues of the beads are prevented by reducing the action of the alternating load on the beads. In addition, the base plate formed with the beads is laminated on at least one of those laminated compensating plate and intermediate plate, thereby to increasing the restoration amounts and restoration forces of the beads and improving the sealing effect.

The above and other objects, features and advantages of the present invention will be more apparent from the following detailed description in conjunction with the accompanying drawings.

DETAILED DESCRIPTION

Figure 1:
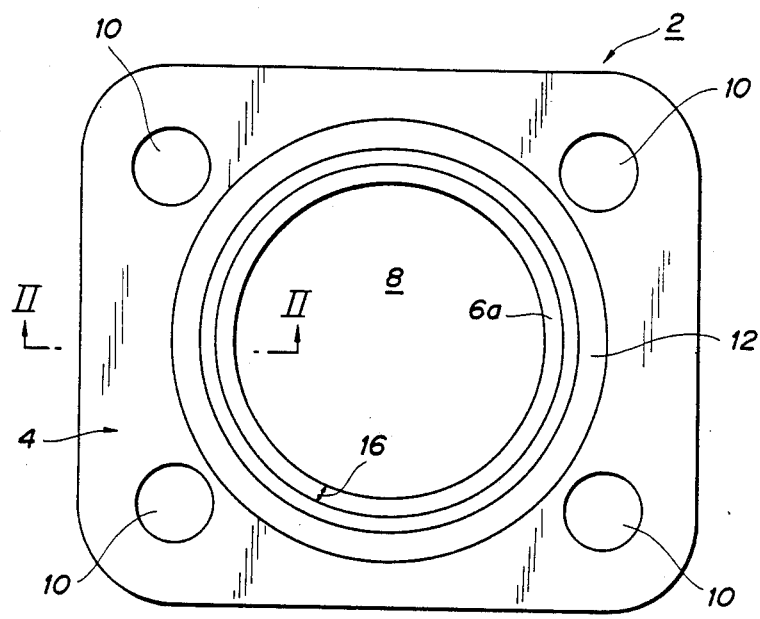
FIG. 1 is a plan view of a metallic gasket according to the first embodiment of the invention.

Embodiments of the present invention will be described in detail hereinafter with reference to the drawings. In the first to fifth embodiments shown in FIGS. 1 to 9, the parts and components having the same functions are designated by the same reference numerals and an explanation will be made.

Figure 2:
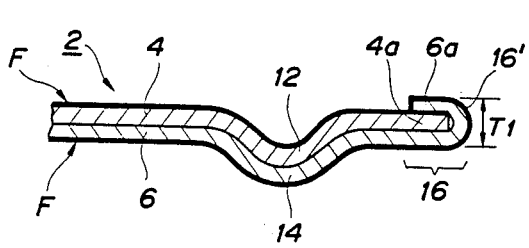
FIG. 2 is an enlarged cross-sectional view of the main part taken along the line II—II in FIG. 1.
Figure 3:
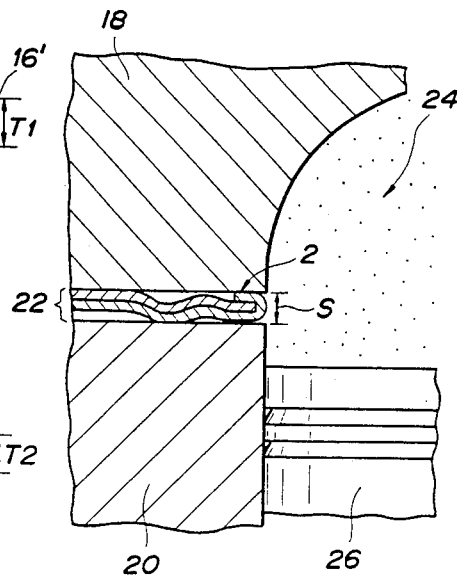
FIG. 3 is a fragmentary cross-sectional view where the metallic gasket shown in FIG. 1 is interposed in a joint area.

FIGS. 1 to 3 show the first embodiment of the invention, in which a metallic gasket 2 is constituted by a flat base plate 4 made of an elastic metal plate and a flat compensating or subplate 6 made of an elastic metal plate which is laminated on the base plate 4. A combustion chamber hole 8 is formed in the base plate 4 and subplate 6. A plurality of bolt holes 10 (Four bolt holes 10 in this embodiment) are formed in the base plate 4 and subplate 6 at positions around the hole 8. The base plate 4 is formed with a single annular bead 12 so as to closely surround the hole 8. On one hand, the subplate 6 is formed with a single annular bead 14 so as to interfit within and abut on the back surface of the bead 12 of the base plate 4.

An edge 6a of the subplate 6 around the side or perimeter of the hole 8 is folded axially in the direction opposite to the axially projecting direction of the bead 12 of the base plate 4 (namely, upwardly in FIG. 2) and then radially outwardly through an angle of about 180° due to bending or the like in a manner such as to surround and sandwich an inner annular edge portion 4a of the base plate 4 and to overlap the inner and upper surfaces of the edge portion 4a. Thus, the metallic gasket 2 is formed with a commpensating rim portion 16 having a predetermined thickness of T1 around the perimeter of the combustion chamber hole 8, this rim portion 8 being positioned radially inwardly of the beads 12 and 14. As will be understood from FIG. 2, the thickness of the compensating portion 16 has a value equal to the sum of the thickness of the edge portion 4a of the base plate 4, the thickness of the subplate 6, and the thickness of the folded edge 6a of the subplate 6. Thus, the compensating rim portion 16 is formed thicker than the other portion, namely the two-layer laminated portion defined by the base plate 4 and subplate 6, thereby compensating for the gap between the deck surfaces which is formed when a cylinder head is tightened. In this manner, increase and decrease of the gap between the deck surfaces are prevented.

In FIG. 3, numerals 18 and 20 respectively denote a cylinder head and a cylinder block constituting an internal combustion engine. The metallic gasket 2 of this invention is interposed in a joint area 22 between the deck surfaces of the cylinder head 18 and cylinder block 20 and is tightened by tightening bolts (not shown). Numeral 24 indicates a combustion chamber, 26 is a piston, and S is a gap which is formed between the deck surface of the cylinder head 18 and cylinder block 20 around the combustion chamber 24.

Sealing materials F are preferably coated on both side surfaces of the metallic gasket 2, namely, on the upper surface of the base plate 4 and on the lower surface of the subplate 6 as shown in FIG. 2. The sealing materials F function to compensate for the irregular or rough deck surfaces or the like.

The sealing materials F may also be coated on the surfaces of the base plate 4 and/or subplate 6 in the joint area around these plates.

Since the edge 6a of the subplate 6 sandwiches the edge 4a of the base plate 4, the subplate 6 and base plate 4 are integrally formed, so that the metallic gasket 2 allows relative sliding between the subplate 6 and the base plate 4 to thereby improve the sealing performance of the gasket.

When the metallic gasket 2 is compressed and deformed due to the tightening forces of the bolts, the inner edge surface 16' of the compensating portion 16 coincides (i.e., aligns) with the inner peripheral surface of the combustion chamber 24, as explained hereinafter. Thus, as shown in FIG. 3, the edge surface of the compensating portion 16 is prevented from projecting into the combustion chamber 24, and a concave portion is prevented from being formed between the edge surface of the compensating portion 16 and the combustion chamber 24. It is also possible to prevent the deterioration of the engine performance due to a variation in combustion state which might otherwise be caused by obstructing the flow of intake air or the like.

The operation of the first embodiment will be described hereinbelow.

The metallic gasket 2 interposed in the joint area 22 between the cylinder head 18 and the cylinder block 20 is compressed due to the tightening forces of the bolts, so that the beads 12 and 14 are compressed and deformed and their heights are reduced. Due to the deformations, the beads 12 and 14 are brought into contact with the deck surfaces of the cylinder head 18 and cylinder block 20 at predetermined surface pressures, respectively, thereby attaining a sealing effect. When the bolts are tightened, as shown in FIG. 3, the cylinder head 18 is curved and distorted. Particularly, the gap S between the deck surfaces around the combustion chamber 24 increases. However, since the compensation portion 16 of thickness T1 is provided around the periphery of the combustion chamber hole 8, it is possible to suppress the increase of the gap S which is caused due to the distortion of the cylinder head 18.

Thus, leakage of the combustion gas from the gap S can be prevented. In addition, the increase and decrease of the gap S between the deck surfaces due to influences of combustion gas pressure and engine heat can be prevented. Also, the alternating load acting on the beads 12 and 14 is reduced by the compensating portion 16. Fatigues of the beads 12 and 14 are prevented, resulting in a long operational life. It is also possible to prevent damage to the tightening bolts and to the portions of the cylinder head 18 which come into engagement with the bolts. The reductions in the tightening forces of the tightening bolts can be prevented, and the decrease in sealing effect can be prevented.

In addition, according to the first embodiment, the laminated structure of the bead 12 of the base plate 4 and the bead 14 of the suplate 6 allows the restoration forces of the bead portions to be increased, thereby improving the sealing effect of the bead portions. Therefore, the joint area 22 around the combustion chamber is sealed at two positions, namely at the compensating rim portion 16 and at the beads 12 and 14, so that a higher sealing effect can be obtained and leakage of the combustion gas is efficiently prevented. Further, the laminated structure of the beads 12 and 14 allows the edge 6a of the subplate 6 to be similarly pushed out in association with the push-out motion of the edge 4a of the base plate 4, thereby preventing the inner edge surface of the edge portion 4a from coming into contact with or being restrained by the folded edge portion 6a. Thus, damage to the compensating rim portion 16 can be prevented and the operational life can be elongated.

Moreover, the first embodiment has the effects such that its constitution is simple and the costs of materials and the manufacturing cost are reduced and the cost of the product can be reduced.

The second embodiment of the invention will now be described with reference to FIG. 4.

The second embodiment has the following features. The flat subplate 6 having a thickness less than the base plate 4 and having a constitution such that the bead 14 is omitted therefrom is laminated on the upper surface of the base plate on the side opposite to the projecting direction of the bead 12. Further, the edge portion 6a of the subplate 6 is folded around edge 4a in the projecting direction of the bead 12 (i.e., downwardly in FIG. 4), thereby forming the compensating rim portion 16 of predetermined thickness T2 in a manner similar to the first embodiment.

Figure 4:
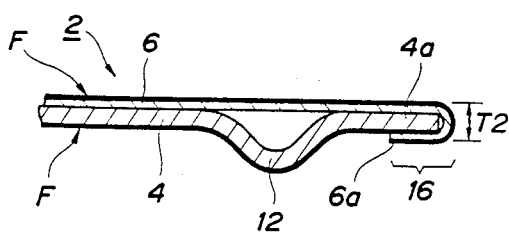
FIG. 4 is an enlarged cross-sectional view of the main part of a metallic gasket according to a second embodiment of the invention.

The sealing materials F are preferably coated on both side surfaces of the metallic gasket 2, namely on the lower surface of the base plate 4 and on the upper surface of the subplate 6 as shown in FIG. 4. The sealing materials F may be also coated on the surfaces on the base plate 4 and/or subplate 6 in the joint area between the plates.

According to the constitution of the second embodiment, an effect similar to that in the first embodiment is derived. Namely, when the bead 12 is deformed due to the tightening forces of the tightening bolts (not shown) when the cylinder head is tightened, the subplate 6 acts so as to increase the restoration force of the bead 12 since the edge 6a of the subplate 6 supports the edge 4a of the base plate 4. Thus, the spring constant of the base plate 4 is increased and the sealing performance of the bead portion can be improved.

As described in detail above, according to the first and second embodiments of the invention, the compensating rim portion of predetermined thickness is formed to compensate for the gap between the deck surfaces which is produced around the combustion chamber hole when the cylinder head is tightened. Thus, it is possible to prevent the increase and decrease of the gap between the deck surfaces around the combustion chamber which are caused due to influences of the combustion gas pressure and the heat of the engine, thereby making it possible to prevent leakage of the combustion gas from the joint area around the combustion chamber. It is also possible to prevent pollution of the metallic gasket due to the leaked combustion gas and reduction of the sealing effect due to deposition of the material contained in the leaked combustion gas. Further, the alternating load acting on the beads can be reduced and the fatigues of the beads are prevented and the operation time is elongated. The damage to the tightening bolts and of the cylinder head portions where the bolts come into engagement can be prevented.

A decrease in tightening forces of the tightening bolts can be prevented and a stable sealing effect can be obtained.

The combustion can be simplified and the metallic gasket can be easily manufactured and the manufacturing costs can be reduced.

Moreover, by providing the subplate with a bead which is laminated on the bead of the base plate, the restoration force of the bead portion can be increased and the sealing effect of the bead portion can be improved. Therefore, the portion around the combustion chamber is surrounded by both the compensating rim portion having a large sealing effect and the bead portion, thereby enabling leakage of the combustion gas to be efficiently prevented. Also, since the edge of the subplate is similarly pushed out in association with the push-out motion of the edge of the base plate, the edge surfaces of the edge part of the base plate is not forced radially into contact with the folded portion of the edge of the subplate. Damage to the compensating portion is prevented and the operational life can be elongated.

The third embodiment of the invention will now be described in detail hereinbelow with reference to FIGS. 5 to 7.

Figure 5:
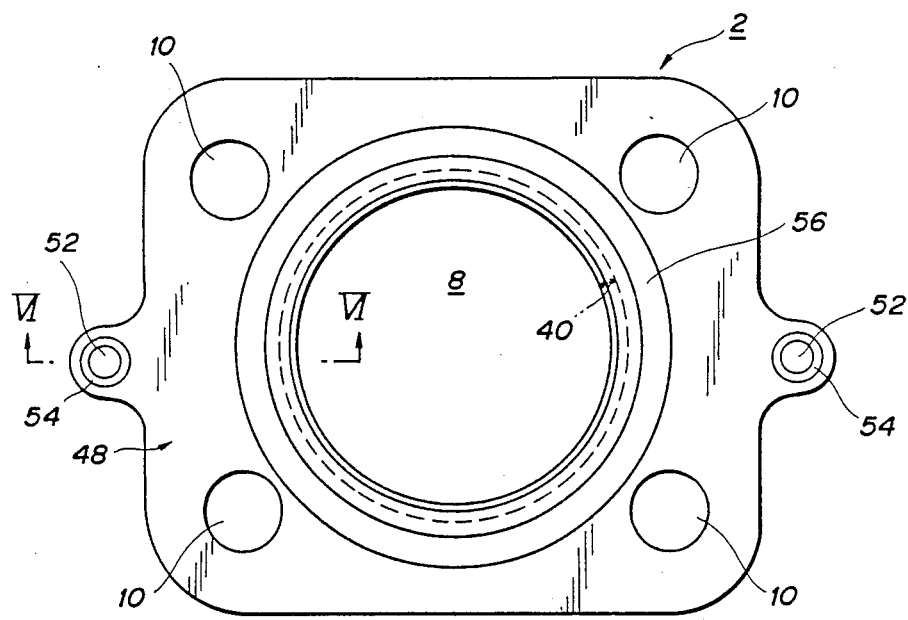
FIG. 5 is a plan view of a metallic gasket according to a third embodiment of the invention.
Figure 6:
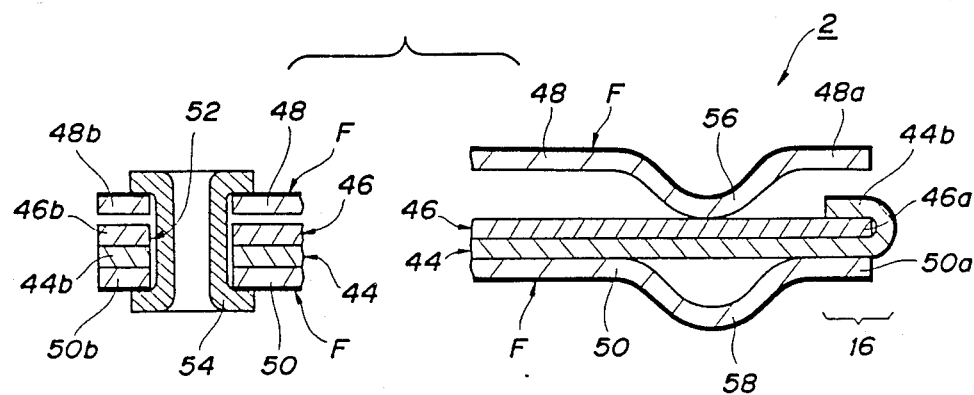
FIG. 6 is an enlarged cross-sectional view of the main part taken along the line VI—VI in FIG. 5.
Figure 7:
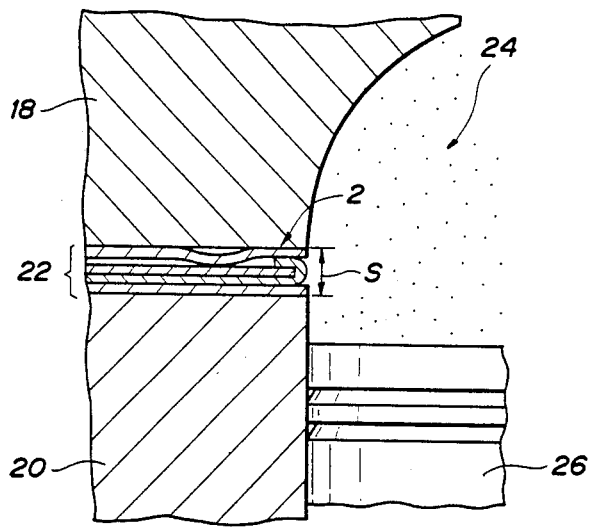
FIG. 7 is a fragmentary cross-sectional view where the metallic gasket shown in FIG. 5 is interposed in a joint area.

FIGS. 5 to 7 show the third embodiment of the invention, in which the metallic gasket 2 is constituted by a compensating plate 44, an intermediate plate 46, and first and second base plates 48 and 50 made of elastic metal plates. The compensating plate 44 is formed with the combustion chamber hole 8 and a plurality of (four in FIG. 5) bolt holes 10 are formed around the combustion chamber hole 8 in a manner similar to the first and second embodiments. The intermediate plate 46 is laminated on the compensating plate 44. An inner annular edge part 44a around the edge of the combustion chamber hole 8 of the plate 44 is folded around (upwardly and outwardly in FIG. 6) through an angle of about 180° due to bending or the like so as to sandwich an inner annular edge 46a of the intermediate plate 46.

The first base plate 48 and the second base plate 50 made of elastic metal plates are arranged on opposite sides of the laminated plates 44 and 46 so as to sandwich these plates therebetween. The first base plate 48 is formed with a first annular bead 56 so as to externally surround the free edge portion 46b of the edge part 44a where it overlaps and is laminated on the upper surface of the intermediate plate 46. In FIG. 6, the first bead 56 is downwardly projected, and the first base plate 48 is laminated over the intermediate plate 46 in a manner such that just the summit of the first bead 56 comes into contact with the intermediate plate 46, and the inner annular edge part 48a which surrounds the combustion chamber hole 8 is located axially directly over the edge portion 44b. The second base plate 50, formed with a second annular bead 58, is laminated on the compensating plate 44. The second bead 58 is downwardly projected in FIG. 6 away from the plate 44 and the second base plate 50 has the same shape as the first base plate 48. The summits of the first and second beads 56 and 58 are formed or projected in the same direction (i.e., downwardly in this example) and through the same vertical extent. The inner annular edge part 50a around the perimeter of the combustion chamber hole 8 is laminated to the compensating plate 44 at a position just below the edge part 44b thereof. Due to this, the compensating portion 16 having a predetermined thickness is formed around the combustion chamber hole 8 by the compensating plate 44, the edge 44b thereof, the edge 46a of the intermediate plate 46, the first edge 48a, and the second edge 50a. Practically speaking, the thickness of the compensating rim portion 16 has a value equal to the sum of the thickness of the compensating plate 44, the thicknesses of the edges 44b, 46a, 48a, and 50a, and the thickness corresponding to the gap which is formed between the edges 44b and 48a. Consequently, when the cylinder head is tightened, the compensating portion 16 as formed is thicker than the other portion, namely, the four-layer laminated portion consisting of the plates 44, 46, 48, and 50, thereby compensating for the gap between the deck surfaces around the combustion chamber 24 and preventing the increase and decrease of the gap between the deck surfaces.

In addition, sealing materials F are preferably coated on both side surfaces of the metallic gasket 2, namely on the upper surface of the first base plate 48 and on the lower surface of the second base plate 50 in FIG. 6. The sealing materials F may be also coated on the surfaces of the compensating plate 44 and/or intermediate plate 46 in the joint area between these plates.

In the metallic gasket 2 as shown in FIGS. 5 and 6, in order to fixedly join the first base plate 48, intermediate plate 46, compensating plate 44, and second base plate 50, they are fixedly joined at predetermined positions adjacent the outer peripheral portions thereof, for example at two positions adjacent opposite sides of the gasket. At each position, a hole 52 is formed through the respective outer edge parts 48b, 46b, 44b and 50b of the plates. Then, these outer edge parts 48b, 46b, 44b and 50b are joined together by a rivet member 54 extending through the hole 52. In this manner, the plates 48, 46, 44 and 50 are axially joined together as a unit. However, radial sliding between the first and second base plates 48 and 50 is allowed by this connection, and the sealing effect is improved. This axial joining technique is also applicable to the other embodiments, including specifically FIG. 9.

Referring now to FIG. 7, numerals 18 and 20 denote the cylinder head and cylinder block constituting the internal combustion engine as mentioned before. The metallic gasket 2 of the third embodiment of the invention is interposed in the joint area 22 between the deck surfaces of the cylinder head 18 and cylinder block 20 and then tightened by tightening bolts (not shown). Numeral 24 denotes the combustion chamber, 26 is the piston, and S is the gap between the deck surfaces of the cylinder head 18 and cylinder block 20 around the side or perimeter of the combustion chamber as mentioned before.

As shown in FIG. 7, when the metallic gasket 2 of FIGS. 5–6 is compressed and deformed due to the tightening forces of the bolts, the edge surface of the compensating portion 16 coincides or aligns with the inner peripheral surface of the combustion chamber 24.

The operation of the third embodiment will be described hereinbelow.

The metallic gasket 2 interposed in the joint area 22 between the cylinder head 18 and cylinder block 20 is compressed by the tightening forces of the bolts, so that the first and second beads 56 and 58 are compressed and deformed. Due to these deformations, the first and second beads 56 and 58 are brought into contact with the deck surfaces of the cylinder head 18 and cylinder block 20 at predetermined surface pressures, thereby attaining a sealing effect. When the bolts are tightened, as shown in FIG. 7, the cylinder head 18 is curved and distorted and, in particular, the gap S between the deck surfaces around the combustion chamber 24 increases. However, by providing the compensating rim portion 16 of predetermined thickness around the side of the combustion chamber hole 8, the large gap S which is produced due to the distortion of the cylinder head 18 can be reduced.

Thus, leakage of combustion gas from the gap S can be prevented. In addition, the increase and decrease of the gap between the deck surfaces due to influences of combustion gas pressure and engine heat are prevented. The alternating load acting on the first and second beads 56 and 58 is reduced by the compensating portion 16, thereby preventing fatigues of the first and second beads 56 and 58. Also, damages to the tightening bolts and to the portions of the cylinder head 18 which come into engagement with these bolts can be prevented. The reduction of the tightening forces of the tightening bolts can also be prevented. The decrease of the sealing effect can be prevented.

According to the third embodiment, since the first and second base plates 48 and 50 are provided so as to sandwich the laminated compensating plate 44 and intermediate plate 46 therebetween, the restoration amount and the restoration force of the bead portion can be increased, and the sealing effect of the bead portion is improved. The joint area around the combustion chamber 24 is sealed by both the compensating portion 16 and the seal portion in this manner, so that a further high sealing effect can be derived and a leakage of the combustion gas is efficiently prevented.

Figure 8:
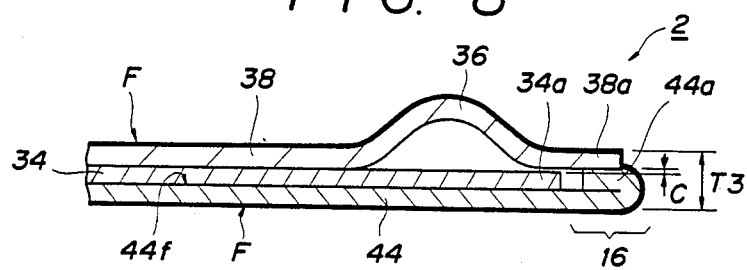
FIG. 8 is an enlarged cross-sectional view of the main part of a metallic gasket according to a fourth embodiment of the invention.

The fourth embodiment of the invention will herein be described with reference to FIG. 8.

The fourth embodiment has the following features. Namely, the edge 44a around the side of the combustion chamber hole 8 of the compensating plate 44 is folded back onto the face 44f of the compensating plate 44 in the direction outwardly away from the hole 8. An intermediate plate 34 which is slightly thinner than the compensating plate 44 is laminated on the face 44f such that an edge 34a of the intermedite plate 34 is spaced apart from the edge 44a. A base plate 38, formed with a bead 36, is laminated on the intermediate plate 34. The bead 36 is upwardly formed so that the summit thereof is directed toward the deck surface of the cylinder head 18. An inner annular edge 38a of the base plate 38 is laminated on the edge 44a. Due to this arrangement, the compensating rim portion 16 having a predetermined thickness T3 is formed by the compensating plate 44, the edge 44a thereof, and the edge 38a. The thickness of the compensating portion 16 has a value which is equal to the sum of the thicknesses of the edge 38a, edge 44a, and compensating plate 44. In this case, a small axial gap C is formed between the top side of the edge 34a of the intermediate plate 34 and the underside of base plate 38 because the intermediate plate 34 is slightly thinner than the compensating plate 44 and its edge 44a as mentioned above.

The sealing materials F are preferably coated on both side surfaces of the metallic gasket 2, namely on the upper surface of the base plate 38 and on the lower surface of the compensating plate 44 as shown in FIG.

8. The sealing materials F may be also coated on the joint surfaces of the base plate 38 and intermediate plate 34 or on the joint surfaces of the intermediate plate 34 and compensating plate 44.

When the metallic gasket 2 is interposed in the joint area 22 of this embodiment and is compressed and deformed due to the tightening forces of the bolts, the edge surfaces of the compensating portion 16 coincides (aligns) with the inner peripheral surface of the combustion chamber 24.

With the constitution of the fourth embodiment, when the cylinder head is tightened, the metallic gasket 2 is compressed due to the tightened forces of the tightening bolts, so that the bead 36 is compressed and deformed. Due to this deformation, the edge 34a is brought into contact with the underside of base plate 38 and the gap C is eliminated. Thus, the compensating rim portion 16 becomes thickest and the large gap S which is produced due to the distortion of the deck surface can be compensated. In addition, this metallic gasket has a simple constitution and the costs of materials and the manufacturing costs are reduced and the cost of the product can be decreased.

The fifth embodiment of the invention will be described hereinbelow with reference to FIG. 9.

Figure 9:
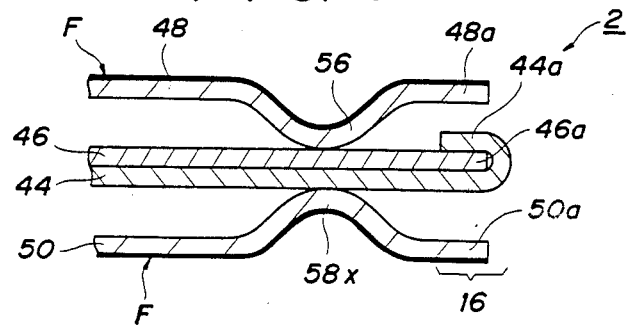
FIG. 9 is an enlarged cross-sectional view of the main part of a metallic gasket according to a fifth embodiment of the invention.

As shown in FIG. 9, the first and second base plates 48 and 50 are laminated on both sides of a laminated structure consisting of the compensating plate 44 and intermediate plate 46. The first bead 56 of the first base plate 48 and a second bead 58x of the second base plate 50 are formed in a manner such that the summit of the first bead 56 contacts the intermediate plate 46 and the summit of the second base 58x contacts the compensating plate 44. The first and second beads 56 and 58x have symmetrical shapes with respect to their opposite faces. The edge 44a of the compensating plate 44 is folded around and laminated on the edge 46a of the intermediate plate 46 in a manner similar to the third embodiment shown in FIG. 6. With this constitution of the fifth embodiment, only the summits of the first and second beads 56 and 58x come into contact with the plates 46 and 44, respectively, so that the restoration amounts and restoration forces of the beads are further increased and the sealing surface pressures can be increased. Even if distortions occur, the beads can follow these distortions and the sealing surface pressures are held constant and the sealing effect can be further improved.

The sealing materials F are preferably coated on both side surfaces of the metallic gasket 2, namely on the upper surface of the first base plate 48 and on the lower surface of the second base plate 50 as shown in FIG. 9.

The sealing materials F may be also coated on the joint surfaces between the first base plate 48 and intermediate plate 46, on the joint surfaces between the intermediate plate 46 and the compensating plate 44, or on the joint surfaces between the compensating plate 44 and second base plate 50.

When the metallic gasket 2 of FIG. 9 is interposed in the joint area 22 in this embodiment and is compressed and deformed due to the tightening forces of the bolts, the edge surface of the compensating portion 16 coincides (aligns) with the inner peripheral surface of the combustion chamber 24.

The sealing or coating layer F preferably comprises a heat resisting elastic coating material to create a microsealing effect. A coating material of a fluororubber or of a silicone resin is preferred, as described below.

(1) Coating material F of a fluororubber:

The coating material comprises a fluororubber as a main component as dissolved in an MEK (methyl-ethyl-ketone) solvent.

The coating process using this fluororubber coating material involves the following basic steps:
  a. The base plate is plated with zinc.
  b. The plated base plate is cleaned with trichloroethylene to remove the oil.
  c. The pleated base plate is allowed to dry.
  d. A first layer of fluororubber coating material, containing a curing agent, is applied to the plated base plate.
  e. The base plate is then put into a furnace and heated at about 150° for about one hour to thereby cure the fluororubber coating material.
  f. A second layer of fluororubber coating material is applied over the first layer and is permitted to dry or cure in the natural air environment or in a furnace.
  g. A thickness of 50$\mu$ or less is preferable for the coating layers.

Thus, it is possible to obtain an extremely good microseal having excellent heat resistance ($-40°$ C. to $\pm 250°$ C.), acid resistance, oil resistance, and solvent resistance.

(2) Coating material F of silicone resin:

This coating material comprises appropriate quantities of silicone resin blended or copolymerized with an organic resin (an alkyd), known as a silicone-modified alkyd, as a main component, and an aluminum powder paste as a heat resisting agent component, which components are combined (for example, a weight ratio of about 2:1), and then a proper quantity of lacquer thinner is added as a solvent.

This coating material may be directly coated onto the base plate and this is then subjected to natural curing. If a gasket having this microsealing material is included in an engine, this microsealing material permeates cracks and concave portions on and in the junction surfaces when the coating material is still soft, thereby filling up the cracks and concave portions. Subsequently, the coating material is thermally cured due to the heat of the engine, causing the microsealing to be further assured.

The microsealing of tool marks, cracks and the like is accomplished with the aid of the film due to the heat resisting coating material such as the foregoing coating material of fluororubber silicone resin or the like. Also, by coating this sealing material over the whole surface of the gasket, the passage of gas is obstructed due to the presence of the coated layer before the pressure can reach the bead portion, so that a pressure reduction effect is attained and excellent sealing can be realized.

As will be obvious from the detailed description of the embodiments, according to the invention, a compensating portion having a predetermined thickness is provided to compensate for the gap between the deck surfaces around the combustion chamber hole which is caused when the cylinder head is tightened. Therefore, the increase and decrease of the gap between the deck surfaces around the combustion chamber due to influences of combustion gas pressure and engine heat are prevented, thereby making it possible to prevent leakage of the combustion gas from the joint area around the combustion chamber. In addition, it is possible to prevent pollution of the metallic gasket due to leaked combustion gas or deterioration of the sealing effect due to the deposition of materials contained in the leaked combustion gas. Further, the alternating load acting on the beads is reduced and the fatigues of the beads are prevented and the operation life is increased. It is also possible to prevent damage of the tightening bolts and of the portions of the cylinder head which come into engagement with the bolts. The reduction of the tightening forces of the tightening bolts can be prevented. A stable sealing effect can be obtained.

On one hand, by laminating the base plate formed with the beads on at least one of the laminated structure consisting of the compensating plate and intermediate plate, the restoration amounts and restoration forces of the beads are increased, so that the sealing effect can be improved.

Although the present invention has been shown and described with respect to preferred embodiments, various changes and modifications which are obvious to a person skilled in the art to which the invention pertains are deemed to lie within the spirit and scope of the appended claims of the invention.

What is claimed is:

1. A metallic gasket for creating a sealed engagement between the cylinder head and cylinder block of an internal combustion engine, comprising:

first, second and third elastic metal base plates disposed in overlying relationship with one another and being laminated together, said second base plate being interposed between said first and third base plates, and said base plates having a combustion chamber hole extending therethrough;

said first base plate having an annular bead formed therein and projecting axially thereof, said bead being spaced radially outwardly from said combustion chamber hole in concentric surrounding relationship thereto;

said second based plate being substantially flat and free of annular beads;

annular compensating means having a predetermined thickness and extending around said combustion chamber hole, said compensating means being disposed radially inwardly of said annular bead;

said annular compensating means including an inner annular edge part of one of said second and third base plates and being folded axially and radially outwardly through an angle of about 180°, said folded inner annular edge part defining said combustion chamber hole; and said third base plate also being flat and free of annular beads, said folded annular edge part being defined on one of said second and third base plates and being folded around the inner annular edge part of the other of said second and third base plates.

2. A gasket according to claim 1, wherein the annular bead formed in said first base plate projects axially toward said second base plate so that said first base plate contacts said second base plate only at the summit of said first annular bead.

3. A gasket according to claim 2, wherein a fourth elastic metal base plate is interposed under said third base plate and is laminated thereto so that said third base plate is disposed between said second and fourth base plates, said combustion chamber hole also projecting through said fourth base plate, said fourth base plate having a second annular bead formed therein and projecting axially thereof, said second annular bead being disposed in concentric relationship to but spaced radially outwardly from said combustion chamber hole.

4. A gasket according to claim 3, wherein said second annular bead projects toward said third base plate so that said fourth base plate contacts said third base plate only at the summit of said second annular bead.

5. A gasket according to claim 3, wherein said second annular bead projects axially from said fourth base plate is a direction away from said third base plate, said fourth base plate being directly laminated to and in contact with said third base plate except in the vicinity of said second annular bead.

6. A gasket according to claim 3, wherein said folded inner edge part is defined on said third base plate and is folded around the inner edge part of said second base plate.

7. A metallic gasket, particularly for use in an internal combustion engine for sealingly cooperating between the cylinder head and cylinder block, comprising:

first and second metallic plate structures disposed in overlying relationship and having a central opening extending therethrough adapted for alignment with the combustion chamber of an internal combustion engine;

annular compensating means associated with said first and second plate structures and extending around and defining therein said central opening;

said compensating means including a inner annular edge part integrally associated with one said plate structure and formed so as to project axially of the central opening and then project radially outwardly so as to radially overlap a side of said one plate structure;

said first plate structure having an annular bead formed thereon radially outwardly from and in substantially concentric surrounding relationship to said compensating means, said annular bead being formed by an annular depression formed in said first plate structure so as to create a projection which extends axially of said first plate structure; and said first and second plate structures respectively comprise single first and second elastic metal plates which overlie one another and are laminated to opposite sides of a third said elastic metal plate which is sandwiched therebetween, said first plate having said bead formed thereon and projecting axially therefrom in a direction away from said third plate, said second plate having said inner annular edge part integrally associated therewith and folded axially and radially inwardly back onto itself so that the folded edge part is sandwiched and laminated between said first and second plates, said second plate and the folded inner edge part having a thickness which is at least slightly greater than the thickness of said third plate, and said first plate having an inner annular edge portion associated therewith and positioned radially inwardly from said bead, said inner annular edge portion directly overlying and being laminated to the folded edge part of said second plate, said third plate normally being slightly spaced from the underside of the inner annular edge portion of said first plate when the gasket is in a nondeformed condition.

8. A metallic gasket for creating a sealed engagement between the cylinder head and cylinder block of an internal combustion engine, comprising:

first, second and third elastic metal base plates disposed in overlying relationship with one another and being laminated together, said second base plate being interposed between said first and third base plates, and said base plates having a combustion chamber hole extending therethrough;

said first base plate having an annular bead formed therein and projecting axially thereof, said bead being spaced radially outwardly from said combustion chamber hole in concentric surrounding relationship thereto;

said second base plate being substantially flat and free of annular beads;

annular compensating means having a predetermined thickness and extending around said combustion chamber hole, said compensating means disposed radially inwardly of said annular bead;

said annular compensating means including an inner annular edge part of one of said second and third base plates and being folded axially and radially outwardly through an angle of about 180°, said folded inner annular edge part defining said combustion chamber hole;

said third plate having a second annular bead formed therein and projecting axially therefrom, at least one of said first and second annular beads having the summit thereof maintained in contact with said second base plate; and a fourth base plate interposed and laminated between said second base plate and one of said first and third base plates, each of said second and fourth base plates being substantially flat and free of annular beads and directly laminated one over the other, said folded annular edge of said second base plate being folded around an inner annular edge of said fourth base plate.

* * * * *

UNITED STATES PATENT AND TRADEMARK OFFICE
CERTIFICATE OF CORRECTION

PATENT NO. : 4 799 695
DATED : January 24, 1989
INVENTOR(S) : Nobuo YOSHINO

It is certified that error appears in the above-identified patent and that said Letters Patent is hereby corrected as shown below:

Column 12, line 26; change "a inner" to ---an inner---.

Signed and Sealed this

Twelfth Day of December, 1989

Attest:

JEFFREY M. SAMUELS

*Attesting Officer*     *Acting Commissioner of Patents and Trademarks*

REEXAMINATION CERTIFICATE (1573rd)
United States Patent [19]
Yoshino

[11] B1 4,799,695
[45] Certificate Issued Oct. 15, 1991

[54] METALLIC GASKET

[75] Inventor: Nobuo Yoshino, Tokyo, Japan

[73] Assignee: Nihon Metal Gasket Kabushiki Kaisha, Saitama, Japan

Reexamination Request:
No. 90/002,237, Dec. 26, 1990

Reexamination Certificate for:
Patent No.: 4,799,695
Issued: Jan. 24, 1989
Appl. No.: 114,699
Filed: Oct. 29, 1987

Certificate of Correction issued Dec. 12, 1989.

Related U.S. Application Data

[60] Division of Ser. No. 827,837, Feb. 7, 1986, abandoned, which is a continuation-in-part of Ser. No. 725,142, Apr. 19, 1985, abandoned, which is a continuation-in-part of Ser. No. 493,174, May 10, 1983, abandoned.

[30] Foreign Application Priority Data

| May 17, 1982 | [JP] | Japan | 57-81530 |
| May 17, 1982 | [JP] | Japan | 57-81531 |
| Dec. 27, 1985 | [JP] | Japan | 60-292892 |
| Dec. 27, 1985 | [JP] | Japan | 60-292893 |

[51] Int. Cl.$^5$ .............................................. F16J 15/08
[52] U.S. Cl. ..................................... 277/231; 277/234; 277/235 B
[58] Field of Search ...................... 277/235 B, 231–234

[56] References Cited
U.S. PATENT DOCUMENTS

| 1,050,132 | 1/1913 | Haynes | 277/213 |
| 2,034,610 | 3/1936 | Dickson | 277/232 |
| 2,397,597 | 4/1946 | Dunkle | 277/213 |
| 3,477,867 | 11/1969 | Hillier | 277/235 B X |
| 3,567,234 | 3/1971 | Skrycki | 277/235 B |
| 3,738,558 | 6/1973 | Colwell | 277/235 B |
| 3,806,138 | 4/1974 | Herrington | 277/234 X |
| 3,817,540 | 6/1974 | Nicholson | 277/236 |
| 4,196,913 | 4/1980 | Oka | 277/235 B |
| 4,290,616 | 9/1981 | Nicholson | 277/235 B |
| 4,471,968 | 9/1984 | Schlaupitz et al. | 277/235 B |

FOREIGN PATENT DOCUMENTS

| 210214 | 12/1959 | Austria | 277/235 B |
| 2030487 | 1/1971 | Fed. Rep. of Germany | 277/235 B |
| 810728 | 3/1937 | France | 277/235 B |
| 50-26822 | 8/1975 | Japan . | |
| 52-41402 | 9/1977 | Japan . | |
| 55-124659 | 9/1980 | Japan . | |
| 57-126553 | 2/1982 | Japan . | |
| 57-144249 | 3/1982 | Japan . | |
| 57-53902 | 11/1982 | Japan . | |
| 58-67949 | 5/1983 | Japan . | |
| 59-188955 | 12/1984 | Japan . | |
| 60-170053 | 11/1985 | Japan . | |
| 1370125 | 10/1974 | United Kingdom | 277/213 |
| 1549200 | 7/1979 | United Kingdom | 277/235 B |

OTHER PUBLICATIONS

Technical Report: Cherry Steel Laminate Gasket by Ishikawa Gasket Co., Ltd. 1979.

*Primary Examiner*—Allan N. Shoap

[57] ABSTRACT

A metallic gasket having a base plate made of an elastic metal plate formed with a combustion chamber hole. A bead is formed on the base plate around the combustion chamber hole. A subplate having a bead is laminated on this base plate. An edge of the subplate, around the combustion chamber hole, is folded back so as to surround and sandwich the edge of the base plate, thereby constituting a compensating rim portion having a predetermined thickness larger than that of the other portion. When the cylinder head is tightened, the metallic gasket is compressed and deformed. However, a sealing effect is assured due to the thick compensating portion.

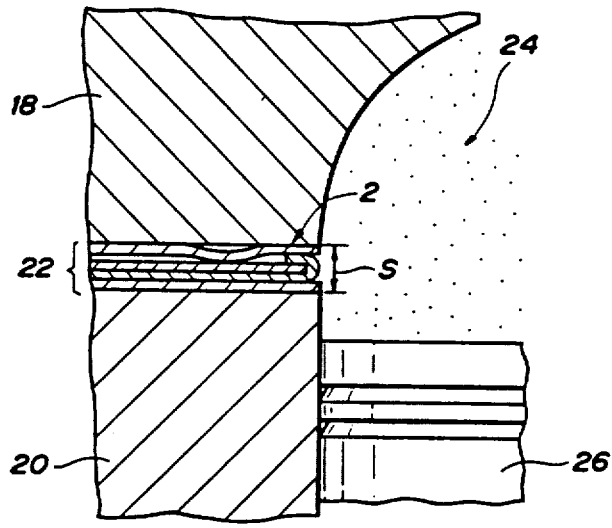

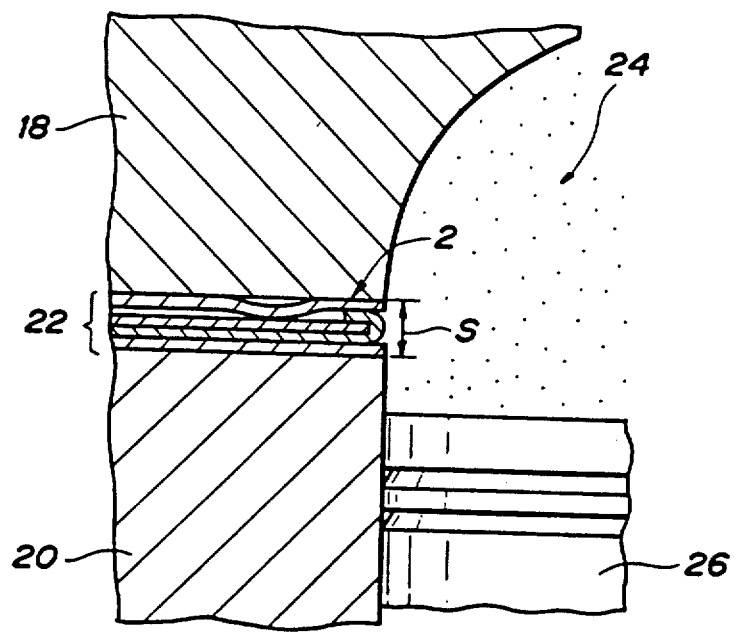

B1 4,799,695

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 8 is confirmed.

Claims 1, 3, 5, and 7 are determined to be patentable as amended.

Claims 2, 4, and 6, dependent on an amended claim, are determined to be patentable.

New claims 9 and 10 are added and determined to be patentable.

1. A metallic gasket for creating a sealed engagement between the cylinder head and cylinder block of an internal combustion engine, comprising:
   first, second and third elastic metal base plates disposed in overlying relationship with one another and being laminated together, said second base plate being interposed between said first and third base plates, and said base plates having a combustion chamber hole extending therethrough;
   said first base plate having an annular bead formed therein and projecting axially thereof, said bead being spaced radially outwardly from said combustion chamber hole in concentric surrounding relationship thereto;
   said second [based] *base* plate being substantially flat and free of annular beads;
   annular compensating means having a predetermined thickness and extending around said combustion chamber hole, said compensating means being disposed radially inwardly of said annular bead;
   said annular compensating means including an inner annular edge part of one of said second and third base plates and being folded axially and radially outwardly through an angle of about 180°, said folded inner annular edge part defining said combustion chamber hole; and
   said third base plate also being flat and free of annular beads, said folded annular edge part being defined on one of said second and third base plates and being folded around the inner annular edge part of the other of said second and third base plates, *one of (1) said folded annular edge part and (2) the remainder of said one base plate being interposed axially between said first base plate and said other base plate.*

3. [A gasket according to claim 2, wherein] *A metallic gasket for creating a sealed engagement between the cylinder head and cylinder block of an internal combustion engine, comprising:*
   *first, second and third elastic metal base plates disposed in overlying relationship with one another and being laminated together, said second base plate being interposed between said first and third base plates, and said base plates having a combustion chamber hole extending therethrough;*
   *said first base plate having an annular bead formed therein and projecting axially thereof, said bead being spaced radially outwardly from said combustion chamber hole in concentric surrounding relationship thereto;*
   *said second base plate being substantially flat and free of annular beads;*
   *annular compensating means having a predetermined thickness and extending around said combustion chamber hole, said compensating means being disposed radially inwardly of said annular bead;*
   *said annular compensating means including an inner annular edge part of one of said second and third base plates and being folded axially and radially outwardly through an angle of about 180°, said folded inner annular edge part defining said combustion chamber hole;*
   *said third base plate also being flat and free of annular beads, said folded annular edge part being defined on one of said second and third base plates and being folded around the inner annular edge part of the other of said second and third base plates;*
   *the annular bead formed in said first base plate projecting axially toward said second base plate so that said first base plate contacts said second base plate only at the summit of said first annular bead; and*
   a fourth elastic metal base [is] interposed under said third base plate and [is] laminated thereto so that said third base plate is disposed between said second and fourth base plates, said combustion chamber hole also projecting through said fourth base plate, said fourth base plate having a second annular bead formed therein and projecting axially thereof, said second annular bead being disposed in concentric relationship to but spaced radially outwardly from said combustion chamber hole.

5. A gasket according to claim 3, wherein said second annular bead projects axially from said fourth base plate [is] *in* a direction away from said third base plate, said fourth base plate being directly laminated to and in contact with said third base plate except in the vicinity of said second annular bead.

7. A metallic gasket, particularly for use in an internal combustion engine for sealingly cooperating between the cylinder head and cylinder block, comprising:
   first and second metallic plate structures disposed in overlying relationship and having a central opening extending therethrough adapted for alignment with the combustion chamber of an internal combustion engine;
   annular compensating means associated with said first and second plate structures and extending around and defining therein said central opening;
   said compensating means including a inner annular edge part integrally associated with one of said plate structure and formed so as to project axially of the central opening and then project radially outwardly so as to radially overlap a side of said one plate structure;
   said first plate structure having an annular bead formed thereon radially outwardly from and in substantially concentric surrounding relationship to said compensating means, said annular bead being formed by an annular depression formed in said first plate structure so as to create a projection which extends axially of said first plate structure; and said first and second plate structures respectively comprise single first and second elastic metal plates which overlie one another and are laminated to opposite sides of a third said elastic metal plate which is sandwiched therebetween, said first plate having said bead formed thereon and projecting axially therefrom in a direction away from said third plate, said second plate having said inner annular edge part integrally associated therewith and folded axially and radially [inwardly] *outwardly* back onto itself so that the folded edge part is sandwiched and laminated between said first and second plates, said second plate and the folded inner edge part having a thickness which is at least slightly greater than the thickness of said third plate, and said first plate having an inner annular edge portion associated therewith and positioned radially inwardly from said bead, said inner annular edge portion directly overlying and being laminated to the folded edge part of said second plate, said third plate normally being slightly spaced from the underside of the inner annular edge portion of said first plate when the gasket is in a nondeformed condition.

9. A gasket according to claim 1, wherein said folded annular edge part includes a portion which radially overlaps said other base plate, said radially overlapping portion being axially separated from said remainder of said one base plate by an axial distance which is approximately equal to the axial thickness of said other base plate.

10. A metallic gasket for creating a sealed engagement between the cylinder head and cylinder block of an internal combustion engine, comprising:

*first, second and third elastic metal base plates disposed in overlying relationship with one another and being laminated together, said second base plate being interposed between said first and third base plates, and said base plates having a combustion chamber hole extending therethrough;*

*said first base plate having an annular bead formed therein and projecting axially thereof, said bead being spaced radially outwardly from said combustion chamber hole in concentric surrounding relationship thereto;*

*said second base plate being substantially flat and free of annular beads;*

*annular compensating means having a predetermined thickness and extending around said combustion chamber hole, said compensating means being disposed radially inwardly of said annular bead;*

*said annular compensating means including an inner annular edge part of one of said second and third base plates and being folded axially and radially outwardly through an angle of about 180°, said folded inner annular edge part defining said combustion chamber hole; and*

*said third base plate also being flat and free of annular beads, said folded annular edge part being defined on one of said second and third base plates and being folded around the inner annular edge part of the other of said second and third base plates, said folded inner annular edge part being disposed in radially overlapping relationship relative to said other base plate but in radially nonoverlapping relationship relative to said annular bead, said folded annular edge part terminating in a radially outer free edge which is spaced radially inwardly from said annular bead.*

* * * * *